(12) United States Patent
McCline et al.

(10) Patent No.: US 8,775,381 B1
(45) Date of Patent: Jul. 8, 2014

(54) PARALLEL DATABASE MIRRORING

(75) Inventors: Matthew C. McCline, Foster City, CA (US); Milena Bergant, San Mateo, CA (US)

(73) Assignee: Pivotal Software, Inc., Palo Alto, CA (US)

( * ) Notice: Subject to any disclaimer, the term of this patent is extended or adjusted under 35 U.S.C. 154(b) by 66 days.

(21) Appl. No.: 13/107,897

(22) Filed: May 14, 2011

(51) Int. Cl.
*G06F 17/30* (2006.01)

(52) U.S. Cl.
USPC .......................................... 707/658; 707/660

(58) Field of Classification Search
CPC ................................................ G06F 17/30578
USPC ........................... 707/655, 656, 658, 659, 660
See application file for complete search history.

(56) References Cited

U.S. PATENT DOCUMENTS

| | | | | |
|---|---|---|---|---|
| 6,289,357 B1 * | 9/2001 | Parker | ........................... | 707/610 |
| 7,177,866 B2 * | 2/2007 | Holenstein et al. | ........... | 707/615 |
| 7,512,755 B2 * | 3/2009 | Iwamura et al. | ............... | 711/161 |
| 7,546,364 B2 * | 6/2009 | Raman et al. | .................. | 709/224 |
| 7,668,874 B2 * | 2/2010 | Kawamura et al. | ........... | 707/674 |
| 7,761,426 B2 * | 7/2010 | Boyd et al. | ..................... | 707/655 |
| 7,788,231 B2 * | 8/2010 | Schlomer et al. | ............. | 707/657 |
| 7,822,715 B2 * | 10/2010 | Petruzzo | ........................ | 707/659 |
| 7,974,943 B2 * | 7/2011 | Gilbert et al. | .................. | 707/610 |
| 2010/0121824 A1 * | 5/2010 | Kawamura et al. | ........... | 707/683 |
| 2010/0235326 A1 * | 9/2010 | Fashchik et al. | .............. | 707/656 |
| 2012/0124000 A1 * | 5/2012 | Rana et al. | ..................... | 707/620 |

\* cited by examiner

*Primary Examiner* — Rehana Perveen
*Assistant Examiner* — Scott A. Waldron
(74) *Attorney, Agent, or Firm* — Fish & Richardson P.C.

(57) ABSTRACT

In a database cluster comprising a plurality of mirrored database segments, a mirror database pair comprising a primary database and a mirror database are maintained substantially consistent by writing changes resulting from transactions to page data in parallel to the primary database and to the mirror database. Changes are sent to the mirror database over a network using network communications. Transaction logs are also written to the primary and mirrored databases in parallel, the transaction logs being sent to the mirror database using network communications. Bulk load changes resulting from transactions are written in parallel over the network to the primary database and the mirror database without writing the changes to a transaction log. In the event of a failure, resynchronization of the mirror database can be performed quickly while avoiding a lengthy ongoing redo process on the mirror database.

20 Claims, 7 Drawing Sheets

PARALLEL DATABASE MIRRORING

BACKGROUND

This invention relates generally to databases for bulk digital data storage and retrieval, and more particularly to data storage in mirrored data warehouse databases.

A data warehouse database is a repository of an enterprise's digital stored data that provides an architecture for data flow to support operational systems such as online transaction processing (OLTP). Data warehouse databases generally have very large database sizes, and experience very high volumes of bulk loads. To provide high database service availability, database mirroring software has been employed whereby a primary database maintains a second database copy in a mirror database that is kept up to date to be capable of taking over processing in the event of failure of the primary database. The primary database has also been responsible for catching up or re-synchronizing the mirror database when it has been temporally down or network communications have temporally been lost. An important measure of database service availability is the time it takes for a mirror database to take over processing once a failure of the primary database has been detected. This time is referred to as the mean-time-to-repair (MTTR). During takeover, no service is available because the primary database is down and the mirror database has not taken over service.

Conventional database software mirroring requires that a transaction log which records transaction changes to the primary database be shipped from the primary database to the mirror database, and that ongoing redo of transactions in the mirror database be performed by the mirror database by sequentially reading transactions in the transaction log and redoing the changes reflected in the log in its mirror database. This conventional approach which is referred to as "log shipping" requires that the mirror database finish its redo application (catch-up) before it can take over processing. For data warehouses, such ongoing database redo is too slow and inefficient for such large systems. During a transaction session, parallel work sessions may be occurring on the primary database which can be doing input—output (I/O) on database pages to be modified. In contrast, the mirror database must sequentially read the transaction log in order to apply changes to its database, and cannot do physical I/O in parallel during this process. Thus, the mirror database may fall behind during high volumes of bulk loads, and unacceptably increase the takeover time and the time during which service is unavailable.

A known performance enhancement for large database transaction loads is to bypass the transaction log, also known as the Write-Ahead-Log (WAL), and bulk load (write) the changes directly to database files. The advantage of bypassing the WAL is that the shared memory database page cache is not polluted with new pages, and the data is not written twice, i.e., once to the transaction log and a second time to the database file by a background writer. However, this cannot be done in a mirrored database arrangement since mirroring is performed using log shipping and bypassing the WAL cannot be done. It would also reduce performance because all bulk load changes would need to go through the WAL.

It is desirable to provide database mirroring solutions which address the foregoing and other problems of known approaches, by improving mirror database pair performance and reducing the mirror takeover processing time.

BRIEF DESCRIPTION OF DRAWINGS

FIG. 4, comprising FIG. 4A and FIG. 4B, illustrates the known conventional transaction log shipping approach to mirroring databases;

FIG. 5, comprising FIG. 5A and FIG. 5B, illustrates a process for mirroring of database pages and transaction logs in accordance with an embodiment of the invention that avoids the problems associated with the conventional process of FIG. 4.

DESCRIPTION OF PREFERRED EMBODIMENTS

The invention is particularly well adapted for use with a data warehouse databases that have very large database sizes and very high volumes of bulk loads, and will be described in that context. As will be appreciated, however, this is illustrative of only one utility of the invention.

Figure 1:
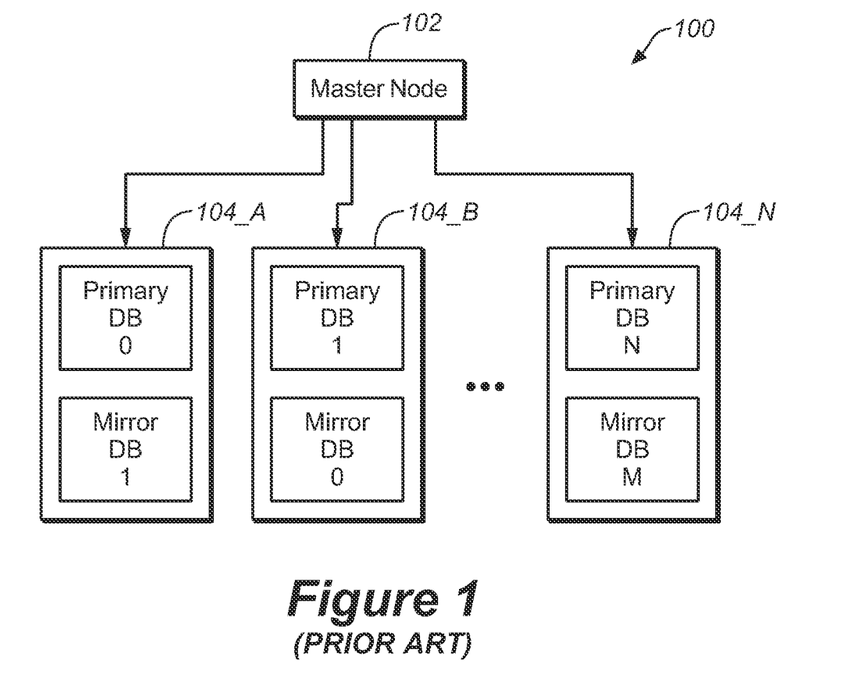
FIG. 1 is a block diagram that illustrates a known network architecture of a logical database cluster in which the invention may be employed.

FIG. 1 illustrates a shared-nothing network architecture of a logical database cluster 100 with which the invention may be employed. The network may include a master node 102 which internally connects to a plurality of shared-nothing nodes 104-A through 104-N. Each node may comprise a plurality of database (DB) segments (database instances) including one or more primary databases and one or more mirror databases. As indicated in the figure, for fault tolerance purposes, a primary database and its corresponding mirror database are located on different nodes. Node 104-A may contain, for example, Primary DB 0 and Mirror DB 1, whereas node 104-B may contain Primary DB 1 and Mirror DB 0. Thus, mirroring Primary DB 0 on node 104-A requires that primary data be written to Mirror DB 0 on node 104-B.

Figure 2:
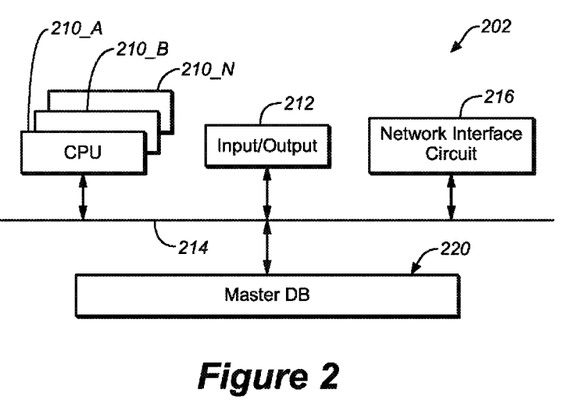
FIG. 2 is a block diagram of a master node of the network of FIG. 1 that may be configured to operate in accordance with an embodiment of the invention.

FIG. 2 illustrates a master node 202 configured to implement operations in accordance with the invention. The method node may comprise a plurality of host CPUs 210-A through 210-N connected to input/output (I/O) Devices 212 by a bus 214. The I/O devices may be primarily storage disks, and may also be other standard computer system input and output devices. A network interface circuit 216 may also be connected to bus 214 to allow the master node to operate in a networked environment. The master node may also have a memory 220 connected to the bus that embodies executable instructions to control the operation of the host computer system of the node and to perform processes in accordance with the invention. Included in memory 220 is a master database instance to which users connect.

Figure 3:
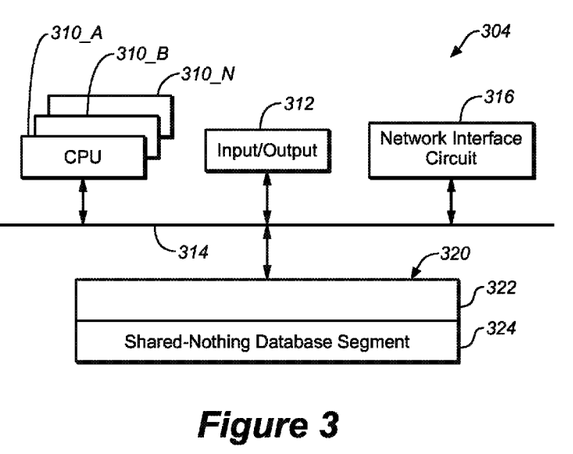
FIG. 3 is a block diagram of a node of the network of FIG. 1 that may be configured to operate in accordance with an embodiment of the invention.

FIG. 3 illustrates a shared-nothing node 304 configured to implement operations in accordance with the invention. Node 304 may have a similar architecture to master node 202, comprising a plurality of host CPUs 310-A through 310-N connected to a bus 314. A set of input/output devices 312, a network interface circuit 316 to afford network connectivity, and a memory 320 may also be connected to the bus. Memory 320 may comprise a first array portion 322 containing data and executable instructions to implement the processes of the invention, and may include one or more shared-nothing database segments 324. The database segments 324 may comprise primary and mirror DB instances.

Figures 4, 4A:
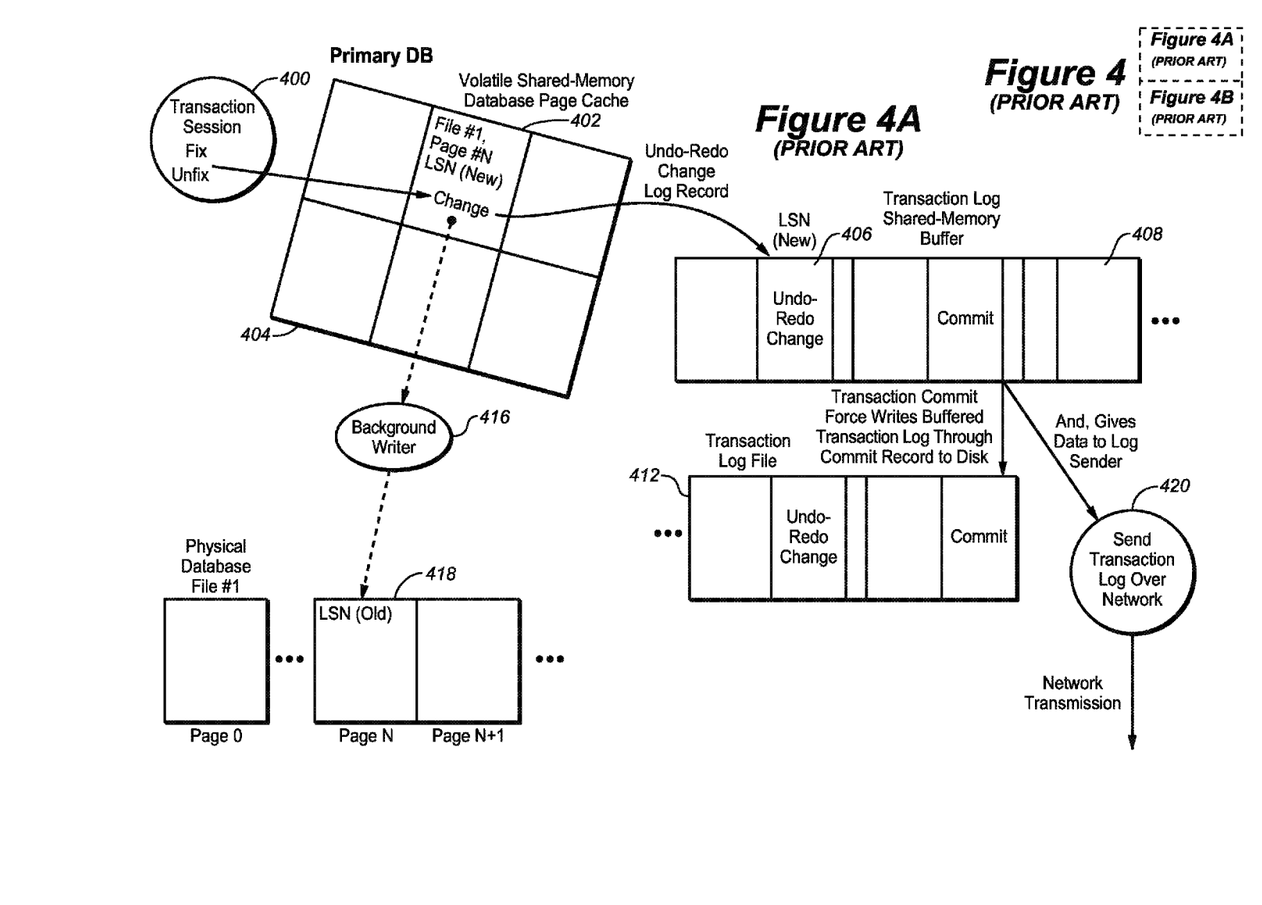
Figure 4B:
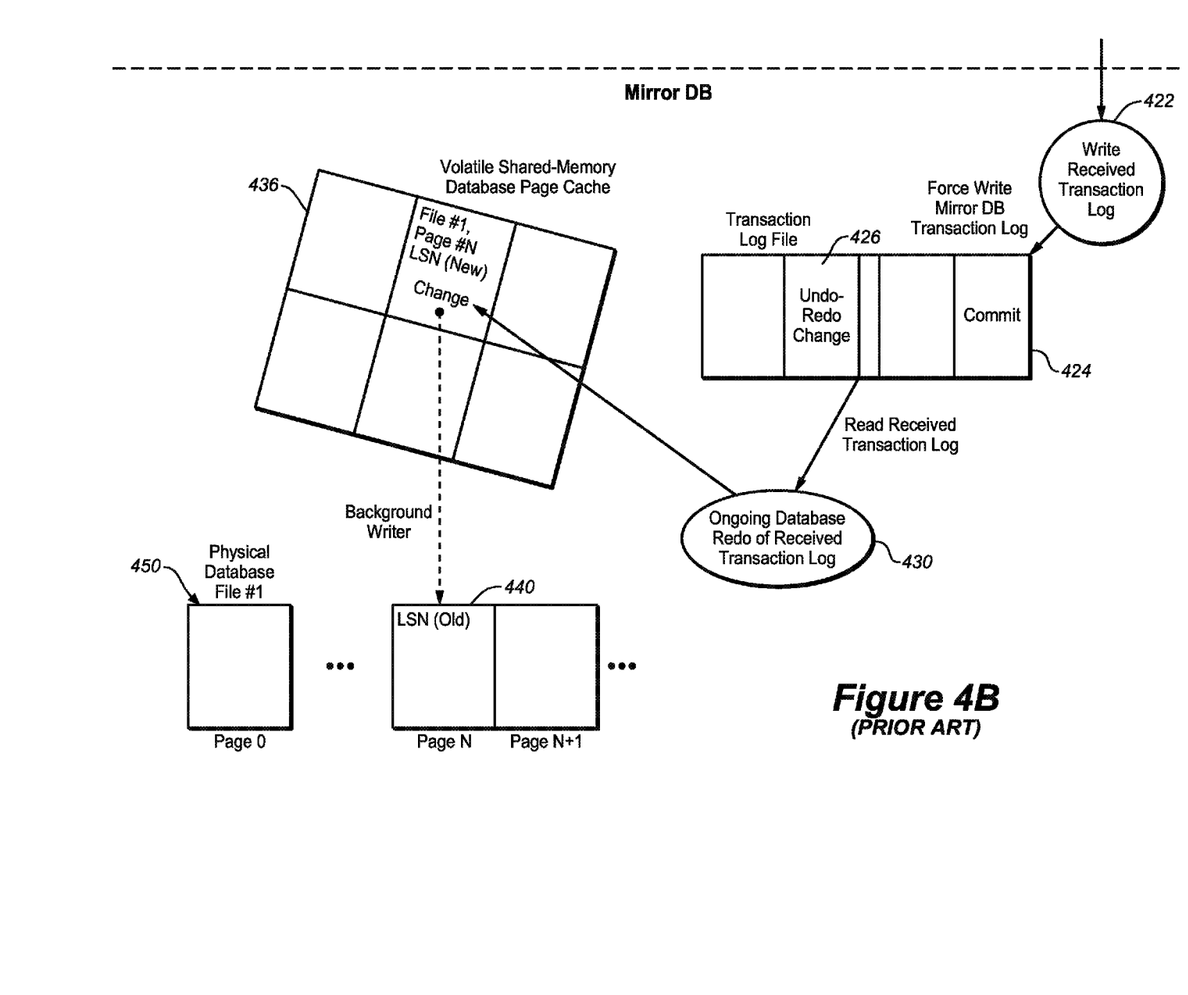

FIG. 4 illustrates the known transaction log shipping and background redo process referred to above that is conventionally employed for mirroring databases and that results in unacceptably long MTTR and has other problems for large databases. This conventional process will be described briefly to provide background and context for a better understanding of the invention.

In the conventional process illustrated in FIG. 4, when a transaction in a transaction session 400 is fixed, a change to a page 402 is made in a volatile shared memory database page cache 404 in the primary DB, and a new log sequence number (LSN) is associated with the change. An undo-redo change log record 406 is generated and recorded with log record location LSN (New) in a volatile transaction log shared memory buffer 408. The conventional WAL protocol requires that all log records that describe changes, i.e., undo-redo, to a page be written to a transaction log in advance of the page being flushed to disk, and the force-log-at-commit protocol requires that the changes made by a transaction be described permanently on disk in a transaction log 412 before the transaction commits. Upon the transaction committing, a background writer 416 writes the changes to the appropriate page 418 in the primary database.

Additionally, upon the transaction committing, the transaction log from the transaction log shared memory buffer 408 is sent, i.e., shipped, at 420, over the network to the mirror database, where it is received 422 as a write received transaction log 424. At the mirror database, the undo-redo change records 426 from the transaction log are sequentially read at 430 and written to a volatile shared memory database page cache 436 in the mirror database. Subsequently, in the background, a background writer writes the pages 440 to the mirror database 450.

As previously noted, changes to the mirror database are written by sequentially reading the transaction log and applying the changes serially to the database pages. When a crash occurs, the crash recovery operation processes the transaction log and applies all changes described in the log to the database pages before any new work is allowed to begin. This recovers the database pages to a consistent state. The problem is that transactions are continuing in parallel to be written to the primary database while the ongoing mirror redo changes to the mirror database are being performed serially can fall behind the changes being made to the primary database. This adversely impacts the availability of the mirror database to take over processing in the event the primary database crashes, since it cannot take over until its redo process is completed, and leads to an unacceptably long MTTR.

The invention addresses this aspect of MTTR by keeping the mirror database substantially up-to-date by writing all data to the mirror and primary databases in parallel and by not using conventional ongoing recovery redo to catch-up the mirror database.

Figures 5, 5A:
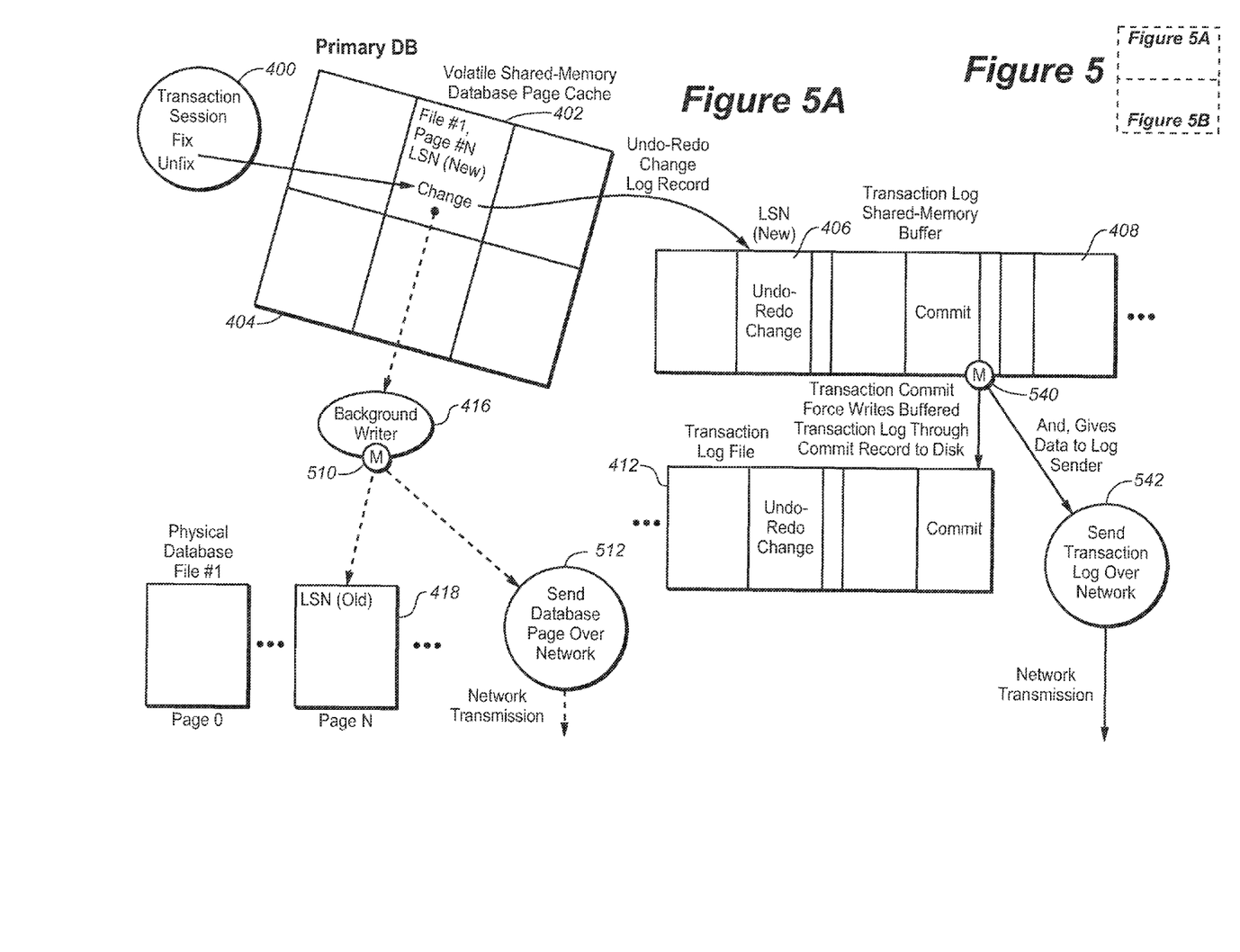
Figure 5B:
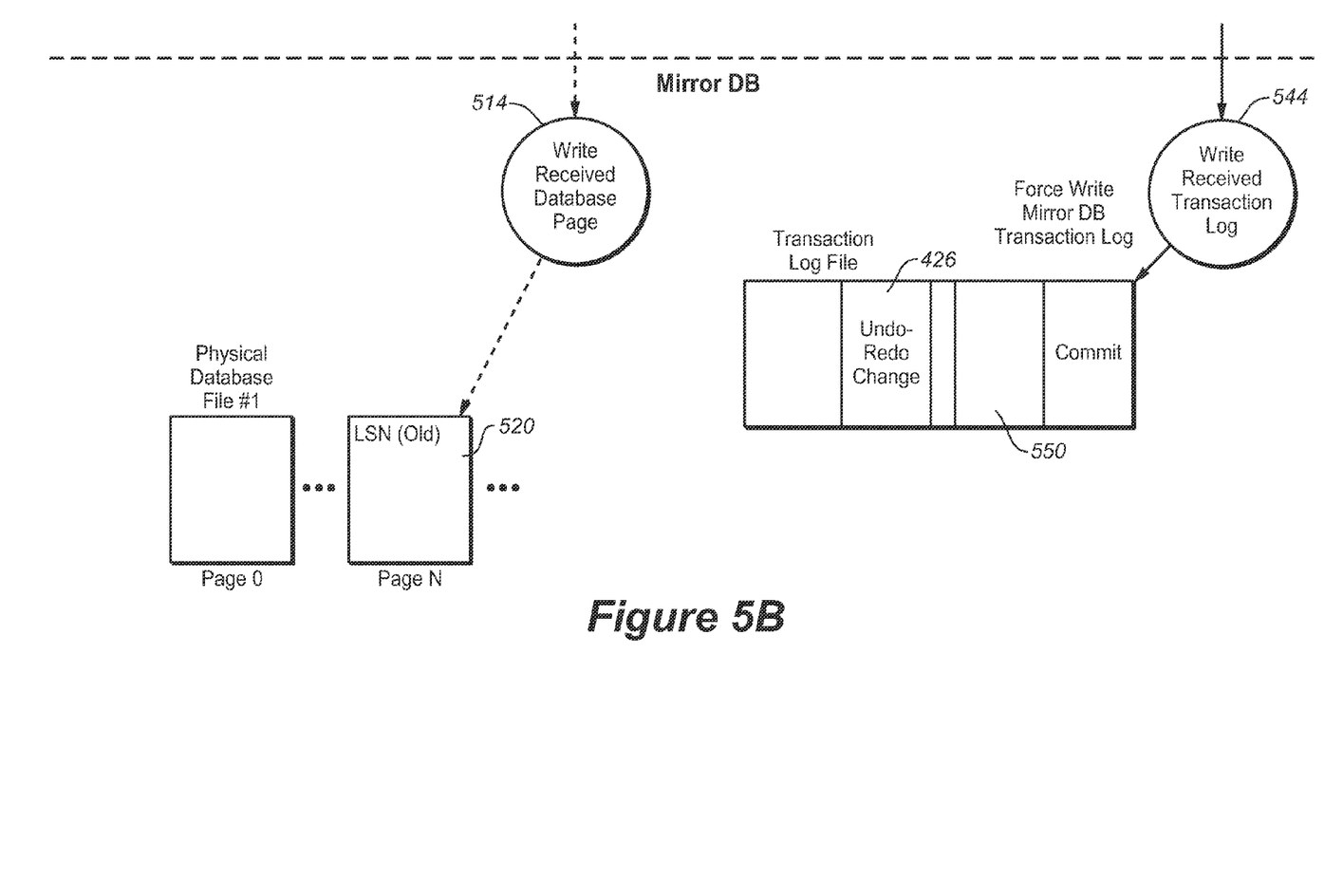

FIG. 5 illustrates a process in accordance with an embodiment of the invention which keeps the primary and mirror databases substantially up-to-date and avoids the ongoing recovery redo process of the prior art to catch up a mirror database. The process of the invention accomplishes this as illustrated in FIG. 5 by substantially modifying the conventional database mirroring process illustrated in FIG. 4 in novel and important respects, while retaining required protocols.

Referring to FIG. 5, while the mirror database is synchronized with the primary database, a mirrored write process 510 writes database pages buffered and asynchronously, in parallel, to both the primary and mirror databases. The mirrored write process 510 writes the page changes directly to the primary database page 418, and sends the database page over the network at 512 to the mirror database, where the page is received as a write received database page 514 and written directly to the corresponding mirror database page 520.

Additionally, the process of FIG. 5 includes another mirrored write process 540 that writes the transaction log 408 in parallel to both the primary and mirrored databases while the databases are synchronized. As shown, when the transaction log shared memory buffer 408 is written to the transaction log file 412, it is sent in parallel over the network at 542 using network transmission to the mirror database where it is received as a write received transaction log 544 and written to a transaction log 550 in the mirror database. The transaction logs 412 and 550 are flushed to disk on both the primary and mirror databases at predetermined points for transaction consistency of the mirror database pair. For instance, the transaction logs may be flushed at transaction prepare, transaction commit, etc. points. No slow ongoing redo operation as conventionally done is required at the mirror database, since database pages containing the changes recorded in the transaction logs as backup are also being written in parallel directly to the primary and mirror databases. Significantly, the changes to mirror database pages are not written from the transaction log as an ongoing process as is conventionally done. The WAL protocol for one database is the transaction log that is flushed to disk before changed database pages are written to disk. This protocol ensures that database crash recovery can redo changes in the transaction log and that the database will have no other changes. The WAL protocol is preserved for the mirror database pair by flushing the mirrored transaction log first prior to doing mirrored database page writes.

Importantly, the primary database does not write directly to the mirror database. Instead, network communications that can be controlled by the database software are used between the primary and mirror databases. Sending the data between the primary database and the mirror database using network communications allows both databases to deal with network communication loss or communications timeouts in well known ways, and permits the mirror database to stop writes from the primary database, where necessary, by closing its network connections. If the primary database wrote directly to the mirror database, it would be difficult or impossible to cleanly stop the primary database from writing to the mirror database. Since the primary and mirror databases control and suspend their own writing, the I/O suspension provides a time window to permit a third entity, such as the master node, to decide which database, the primary database or the mirror database, will take over sole processing in the event of failure and declare the other database down. Although the primary database and the mirror database will not have precisely the same physical data because they are writing data independently, by using parallel disk flushes for transaction commits and parallel writes, the invention keeps the two databases substantially identical transactionally.

The master node database maintains a durable storage to remember whether the mirrored database pair is synchronized, whether only one of the databases of the pair is current and which is the current one. Neither the primary database nor the mirror database can be relied upon to know whether it is current following a crash, since they are aware only of their own local status.

Figure 6:
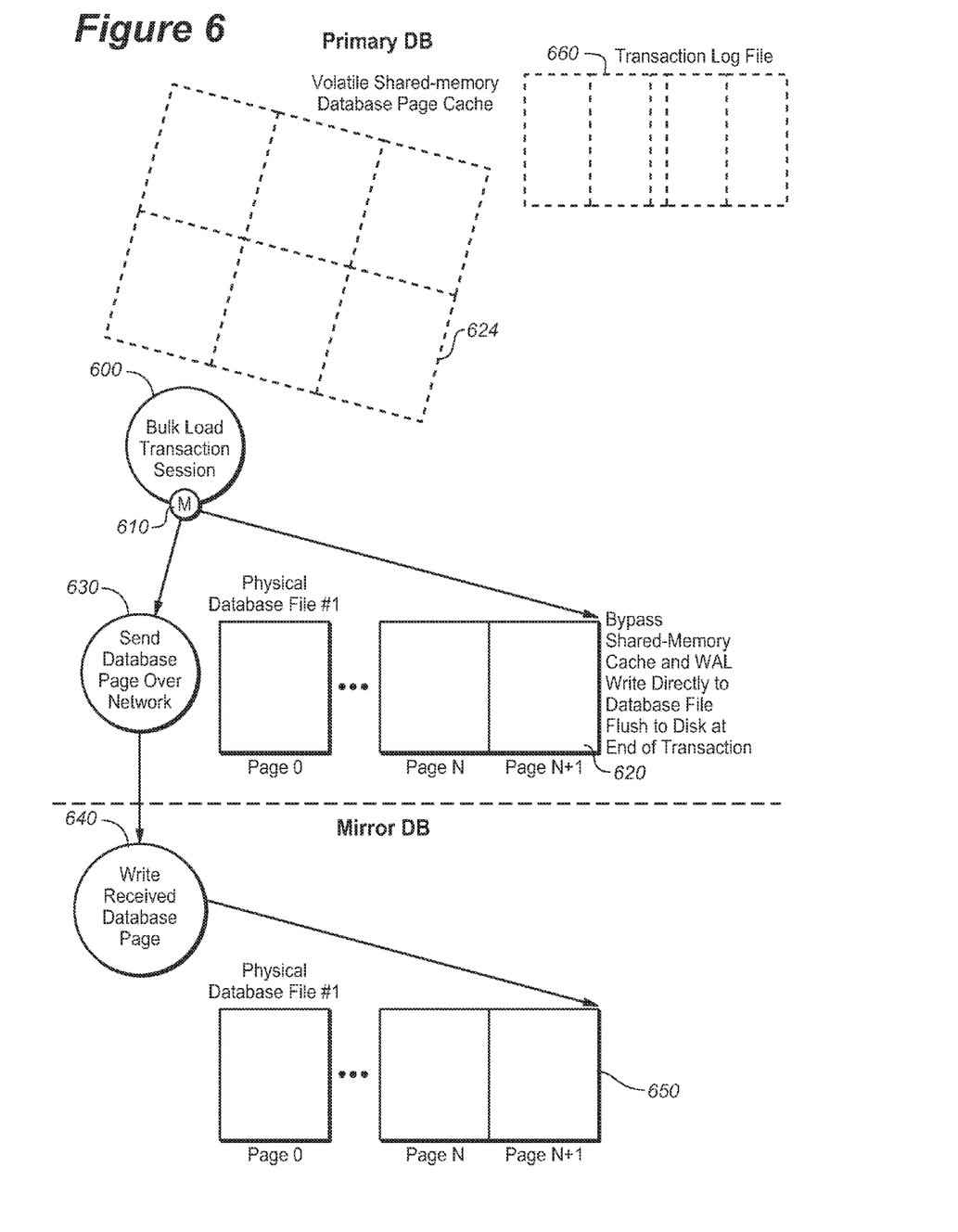
FIG. 6 illustrates a process for bulk load mirroring in accordance with the invention that bypasses a Write-Ahead-Log (WAL).

FIG. 6 illustrates an embodiment of the invention for handling bulk load writes to mirror databases. As shown, upon a bulk load transaction session 600 occurring, a mirrored write process 610 writes a changed page 620 directly to the primary database, without writing to a volatile shared-memory database page cache 624. The mirrored write process also in parallel sends the database page over the network at 630 to the mirror database where it is received as a write received database page 640. A flush to disk is performed at the end of the transaction. At the mirror database, the received database page 640 is written directly to the appropriate page 650 in the physical database file, substantially in parallel with the write of page 620 to the primary database file. Thus, the primary database and the mirror database are logically substantially consistent. For bulk load changes, the transaction log file 660 is not written to the mirror database, thereby avoiding the reduced performance that would occur if all bulk load changes had to go through the WAL protocol.

Parallel database mirroring in accordance with the invention dramatically improves the performance of mirrored databases, and dramatically reduces the mirror takeover processing time in the event of a failure to afford high service availability.

An embodiment of the invention affords a computer storage product comprising a computer readable storage medium storing executable computer instructions for controlling the operations of computer systems to perform the processing operations described herein. The computer readable medium may be any standard media well known and available to those skilled in the art, including, but not limited to magnetic media such as hard disks, floppy disks, magnetic tape; optical media such as CD-ROMs, DVDs, holographic devices; magneto-optical media; and hardware devices configured to store and execute program code, such as application-specific integrated circuits (ASICs), programmable logic devices and ROM and RAM devices.

While the foregoing description has been with reference to particular embodiments of the invention, it will be appreciated by those skilled in the art that modifications to these embodiments may be made without departing from the principles and spirit the invention, the scope of which is defined by the appended claims.

The invention claimed is:

1. A method comprising:
   determining, by a master node of a computer network, that a primary database is synchronized with a mirror database, the primary database being hosted on a first node of the computer network, the mirror database being hosted on a second node of the computer network, each of the master node, the first node, and the second node including one or more computers and being coupled to one another by the computer network; and
   in response to the determining, performing operations comprising:
      writing, by a first mirrored write process, one or more changes to data to the primary database and to the mirror database asynchronously and in parallel, wherein writing the one or more changes comprises:
         writing the one or more changes to a primary database page stored on the first node; and
         sending the one or more changes to the mirror database using network communications between the primary and mirror databases, wherein the one or more changes are written to a mirror database page stored on the second node; and
      writing, by a second mirrored write process that is different from the first mirrored write process, content of a transaction log memory buffer to the primary database and the mirror database asynchronously and in parallel, the content including a record of the one or more changes, wherein writing the transaction log comprises:
         writing the content to a primary database transaction log stored on the first node; and
         sending the content to the mirror database using the network communications between the primary and mirror databases, wherein the content is written to a mirror database transaction log stored on the second node; and
      flushing the primary and mirror database transaction logs to a first non-volatile computer readable storage medium of the first node and a second non-volatile computer readable storage medium of the second node, respectively, at predetermined synchronization points, wherein writing the one or more changes to the mirror database page is performed independently of the mirror database transaction log.

2. The method of claim 1, wherein the primary database transaction log includes records of an undo action changing the data and a redo action changing the data.

3. The method of claim 2, wherein the one or more changes to data comprise changes to one or more database pages in memory.

4. The method of claim 3, the operations further comprising:
   storing a result of the determining in a master node database; and
   determining, by the master node, which of the primary database or the mirror database will take over sole processing in event of a failure.

5. The method of claim 1, wherein each of writing the one or more changes to the primary database page and the one or more changes to the mirror database page comprises writing bulk load changes in parallel to a respective database page.

6. The method of claim 5, wherein during writing bulk load changes to said mirror database page, a transaction log of the primary database is not written to the mirror database.

7. A non-transitory computer readable storage medium comprising executable instructions for controlling a computer system, the executable instructions causing the computer system to perform steps comprising:
   determining, by a master node of a computer network, that a primary database is synchronized with a mirror database, the primary database being hosted on a first node of the computer network, the mirror database being hosted on a second node of the computer network, each of the master node, the first node, and the second node including one or more computers and being coupled to one another by the computer network; and
   in response to the determining, performing operations comprising:
      writing, by a first mirrored write process, one or more changes to data to the primary database and to the mirror database asynchronously and in parallel, wherein writing the one or more changes comprises:
         writing the one or more changes to a primary database page stored on the first node; and
         sending the one or more changes to the mirror database using network communications between the primary and mirror databases, wherein the one or more changes are written to a mirror database page stored on the second node; and
      writing, by a second mirrored write process that is different from the first mirrored write process, content of a transaction log memory buffer to the primary database and the mirror database asynchronously and in parallel, the content including a record of the one or more changes, wherein writing the transaction log comprises:

writing the content to a primary database transaction log stored on the first node; and sending the content to the mirror database using the network communications between the primary and mirror databases, wherein the content is written to a mirror database transaction log stored on the second node; and flushing the primary and mirror database transaction logs to a first non-volatile computer readable storage medium of the first node and a second non-volatile computer readable storage medium of the second node, respectively, at predetermined synchronization points, wherein writing the one or more changes to the mirror database page is performed independently of the mirror database transaction log.

8. The non-transitory computer readable storage medium of claim 7, wherein the primary database transaction log includes records of an undo action changing the data and a redo action changing the data.

9. The non-transitory computer readable storage medium of claim 8, wherein the one or more changes to data comprise changes to one or more database pages in memory.

10. The non-transitory computer readable storage medium of claim 9, the operations further comprising;

storing a result of the determining in a master node database; and determining, by the master node, which of the primary database or the mirror database will take over sole processing in event of a failure.

11. The non-transitory computer readable storage medium of claim 7, wherein each of writing the one or more changes to the primary database page and the one or more changes to the mirror database page comprises writing bulk load changes in parallel to a respective database page.

12. The non-transitory computer readable storage medium of claim 11, wherein during writing bulk load changes to the mirror database page, a transaction log of the primary database is not written to the mirror database.

13. The non-transitory computer readable storage medium of claim 11, the operations further comprising flushing the bulk load changes to the non-volatile computer readable storage medium of the primary database and the non-volatile computer readable storage medium of the mirror database at an end of a transaction that made the one or more changes.

14. The method of claim 5, the operations further comprising flushing said bulk load changes to the non-volatile computer readable storage medium of the primary database and the non-volatile computer readable storage medium of the mirror database at an end of a transaction that made the one or more changes.

15. A system comprising:

a master node including one or more hardware processors;

a first node including one or more hardware processors; and a second node including one or more hardware processors and each of the master node, the first node, and the second node being coupled to one another by a computer network, wherein the system is programmed to perform steps comprising:

determining, by the master node, that a primary database is synchronized with a mirror database, the primary database being hosted on the first node, the mirror database being hosted on the second node; and in response to the determining, performing operations including:

writing, by a first mirrored write process, one or more changes to data to the primary database and to the mirror database asynchronously and in parallel, wherein writing the one or more changes comprises:

writing the one or more changes to a primary database page stored on the first node; and sending the one or more changes to the mirror database using network communications between the primary and mirror databases, wherein the one or more changes are written to a mirror database page stored on the second node; and writing, by a second mirrored write process that is different from the first mirrored write process, content of a transaction log memory buffer to the primary database and the mirror database asynchronously and in parallel, the content including a record of the one or more changes, wherein writing the content comprises:

writing the content to a primary database transaction log memory buffer stored on the first node; and sending the content to the mirror database using the network communications between the primary and mirror databases, wherein the content is written to a mirror database transaction log stored on the second node; and flushing the primary and mirror database transaction logs to a first non-volatile computer readable storage medium of the first node and a non-volatile computer readable storage medium of the second node, respectively, at predetermined synchronization points, wherein writing the one or more changes to the mirror database page is performed independently of the mirror database transaction log.

16. The system of claim 15, wherein the primary database transaction log includes records of an undo action changing the data and a redo action changing the data.

17. The system of claim 15, wherein the one or more changes to data comprise changes to one or more database pages in memory.

18. The system of claim 15, the operations further comprising:

storing a result of the determining in a master node database; and determining, by the master node, which of the primary database or the mirror database will take over sole processing in event of a failure.

19. The system of claim 15, wherein each of writing the one or more changes to the primary database page and the one or more changes to the mirror database page comprises writing bulk load changes in parallel to a respective database page.

20. The system of claim 19, wherein during writing bulk load changes to said mirror database, a transaction log of the primary database is not written to the mirror database.

* * * * *